United States Patent [19]
Dye

[11] Patent Number: 6,083,133
[45] Date of Patent: Jul. 4, 2000

[54] BEVEL GEAR DIFFERENTIAL WITH ASYMMETRICALLY DISTRIBUTED PINIONS

[75] Inventor: James S. Dye, Walworth, N.Y.

[73] Assignee: Zexel Torsen Inc., Rochester, N.Y.

[21] Appl. No.: 09/302,093

[22] Filed: Apr. 29, 1999

Related U.S. Application Data

[60] Provisional application No. 60/084,719, May 8, 1998.

[51] Int. Cl.⁷ .................................................. F16H 48/06
[52] U.S. Cl. ........................................... 475/230; 475/231
[58] Field of Search ...................... 475/230, 231, 475/233

[56] References Cited

U.S. PATENT DOCUMENTS

| | | |
|---|---|---|
| 2,269,734 | 1/1942 | Powell . |
| 3,251,244 | 5/1966 | Nickell . |
| 3,331,262 | 7/1967 | Mazziotti . |
| 4,245,524 | 1/1981 | Dammon . |
| 4,516,443 | 5/1985 | Hamano et al. . |
| 4,612,825 | 9/1986 | Engle . |
| 4,969,532 | 11/1990 | Oyama et al. . |
| 4,978,329 | 12/1990 | Yasui et al. . |
| 5,037,362 | 8/1991 | Teraoka et al. ........................ 475/235 |
| 5,055,096 | 10/1991 | Riemscheid et al. . |
| 5,183,446 | 2/1993 | Hughes . |
| 5,194,058 | 3/1993 | Amborn et al. . |
| 5,215,506 | 6/1993 | Hara . |
| 5,292,291 | 3/1994 | Ostertag . |
| 5,302,159 | 4/1994 | Dye et al. . |
| 5,415,601 | 5/1995 | Cilano . |
| 5,492,510 | 2/1996 | Bowerman . |
| 5,507,702 | 4/1996 | Joachim et al. . |
| 5,545,102 | 8/1996 | Burgman et al. ........................ 475/230 |
| 5,554,081 | 9/1996 | Bowerman . |
| 5,620,388 | 4/1997 | Schlegelmann et al. ............... 475/230 |
| 5,718,653 | 2/1998 | Showalter ............................... 475/230 |
| 5,863,271 | 1/1999 | Schreier et al. ..................... 475/236 X |
| 5,897,453 | 4/1999 | Mimura ............................... 475/230 X |

FOREIGN PATENT DOCUMENTS

| | | |
|---|---|---|
| 0 563 895 | 6/1993 | European Pat. Off. . |
| 2615262 | 5/1987 | France . |
| 4023332 | 3/1992 | Germany . |
| 4027423 | 3/1992 | Germany . |

*Primary Examiner*—Charles A Marmor
*Assistant Examiner*—Roger Pang
*Attorney, Agent, or Firm*—Eugene Stephens & Associates

[57] ABSTRACT

A bevel gear differential, also referred to as an "open" differential, is modified by asymmetrically distributing bevel pinions around a central axis of a pair of side bevel gears. The asymmetrically distributed pinions generate imbalanced radial forces acting on the side gears, which are converted into increased frictional resistance to differentiation. The force imbalance is managed at frictional interfaces to support a wider range of performance options.

25 Claims, 5 Drawing Sheets

BEVEL GEAR DIFFERENTIAL WITH ASYMMETRICALLY DISTRIBUTED PINIONS

This application claims benefit of Provisional Application Ser. No. 60/084,719, filed May 8, 1998.

TECHNICAL FIELD

Bevel gear differentials with increased frictional capabilities for dividing torque between drive shafts provide enhanced automotive performance options including improved traction and stability.

BACKGROUND

Low cost, small packaging, and good reliability are some of the reasons bevel gear differentials have remained a standard for automobiles and trucks since differentials first entered widespread use. Their chief competition arises from specialty products that offer enhanced performance options. One such option provides a traction advantage by resisting normal differential action.

Most automotive differentials provide the primary function of dividing drive power between a pair of drive wheels or between a pair of front and rear axles while allowing the two wheels or axles to rotate at different speeds to accommodate vehicle turning motions, uneven terrain, or differences between the drive wheels themselves. Drive power rotates a differential housing around a common axis of a pair of drive shafts that are connected to the respective drive wheels or axles. Within the housing, a drive train interconnects the drive shafts for equal and opposite directions of rotation (referred to as a −1 speed ratio).

The drive torque that can be applied to the housing is equal to the sum of the torques that can be sustained by the two drive shafts. The torques transmitted to the two drive shafts are normally close to equal, differing only by a small amount of friction generated by the gear train interconnecting them. A traction advantage can be obtained by increasing the friction generated by the gear train or by adding supplemental frictional devices that can support fixed torque differences between the drive shafts.

If the friction opposing relative rotation of the drive shafts is proportional to the drive torque applied to the housing (i.e., a measure of gear train efficiency), then a ratio of torques that can be supported between the drive shafts remains constant over the range of drive torques—a characteristic referred to as "torque proportioning". Relative rotation of the drive shafts (differentiation) occurs when the maximum ratio or "torque bias ratio" is reached. Supplemental frictional devices generally add a fixed amount of friction, referred to as a "preload", which must be overcome regardless of the applied drive torque to permit differentiation.

Many automotive designers prefer options for selecting the frictional characteristics of differentials to assist performance goals. Supplemental frictional components such as springs, clutch plates, and viscous couplings have been added to bevel gear differentials to extend their range of performance. However, if torque proportioning is required, where the friction is a proportional function of the drive torque, other types of gear differentials are normally chosen.

Differential gear trains of parallel-axis (e.g., helical gears) and cross-axis (e.g., worm gears) have been designed to cover a wide range of torque bias ratios. Parallel-axis gear differentials typically support bias ratios through ranges up to around 3 to 1, and cross-axis gear differentials support higher bias ratios of up to 5 to 1 or more. The efficiency range of bevel gear differentials has been much more limited, producing bias ratios in the range of only 1.2 to 1. Gear tooth and bearing mount modifications have been made, but pre-loaded clutch packs or exterior couplings remain the primary way of controlling friction in bevel gear differentials.

SUMMARY OF INVENTION

My invention extends the range of torque proportioning characteristics of bevel gear differentials, providing automotive designers with a wider choice of performance options. The range of bias ratios that can be supported by my new bevel gear differentials is increased, while retaining many of the advantages normally associated with bevel gear differentials including low cost, small packaging, and good reliability.

One example of a torque proportioning bevel gear differential arranged in accordance with my invention includes the usual features of a housing rotatable around a common axis of a pair of drive shafts and a pair of bevel side gears mounted in the housing for rotation with the drive shafts in opposite directions around the central axis. A plurality of bevel pinions are mounted in the housing for rotation around respective axes that intersect the central axis. However, in contrast to conventional bevel gear differentials, the pinion axes are asymmetrically distributed around the central axis of the housing. When torque is applied through the differential, the asymmetrical pinion distribution produces a net radial loading force on the side gears. Friction associated with restraining the radial loading force in the housing is proportional to the applied torque, resulting in an increased torque bias ratio between the drive shafts.

The individual pinion and side gear meshes of conventional bevel gear differentials generate similar axial and radial separating forces. The conventional symmetric distribution of the pinions around the central axis causes the radial loading forces on the side gears to cancel each other (i.e., sum to zero). In contrast, the asymmetric pinion distribution of my invention generates a net radial loading component on the side gears. The total axial loading forces on the side gears are not particularly affected by the asymmetric pinion distribution. However, both the radial and the axial loading forces on the side gears imparted by the asymmetrically distributed pinions generate tipping moments on the side gears that must also be restrained, adding a corresponding amount of friction.

My new bevel gear differential is designed to accommodate these increases in the friction generated by the bevel gear train without unduly stressing or misaligning any of the components. Support and proper alignment of the bevel pinion and side gears within the housing are important for both the performance and durability of the differential. Beyond just accommodating the friction increases made possible by the asymmetrical pinion distributions, my preferred designs include gear mounting structures that also contribute to increasing the total friction generated by the bevel gearing.

For example, the side gears and their frictional interfaces with the housing preferably include axial thrust surfaces that resist tipping by having diameters that exceed diameters at which the axial loading components are applied to the side gears. The larger frictional diameters of the side gear thrust surfaces also contribute to greater frictional resistance to side gear rotation. The side gears can also be made with enlarged hubs that strengthen the side gear mounting within the housing and that radially pilot the side gears at larger diameters to convert the radial separating components into higher frictional forces. Further resistance to side gear tipping can be provided by a spacer block between the two side gears having end faces for engaging inner surfaces of the side gears or opposing bores for piloting inner ends of the drive shafts.

The spacer block is preferably a spider block having legs in the form of journal pins for rotationally supporting the pinions. The pinions can also be formed with hubs to provide additional support and more friction to relative rotation. In a two pinion version, the spider block preferably has a third leg that anchors and centers the spider block in the housing.

The greatest frictional imbalances are created by the fewest pinions in the tightest cluster. My preferred design has just two pinions having axes that are inclined with respect to each other by amounts that can be selected for achieving different torque bias ratios. For assembly purposes, the changes in the pinion mounting positions are limited to multiples of one-half tooth increments of the side gear teeth. The maximum asymmetry is limited by required clearance between adjacent pinions.

DRAWINGS

DETAILED DESCRIPTION

Figure 1:
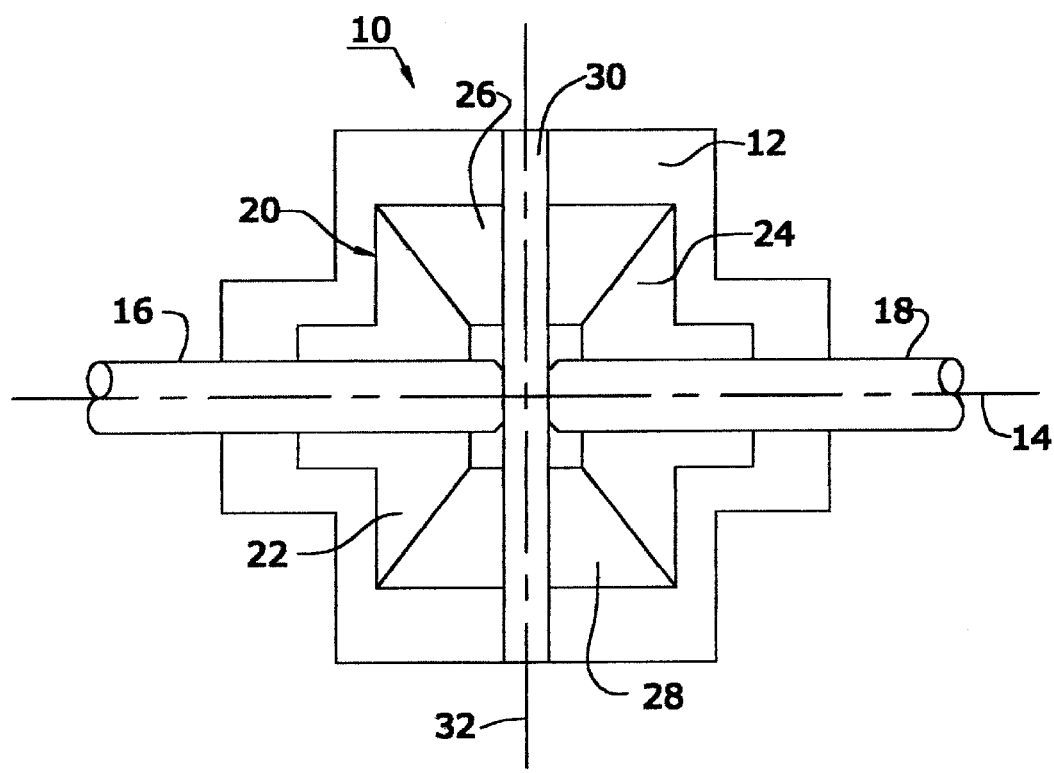
FIG. 1 is a schematic representation of a conventional bevel gear differential rotatable around a central axis.

A conventional automotive bevel gear differential 10 depicted in FIG. 1 provides a frame of reference for the changes made by my invention. A housing 12 is rotatable around a central axis 14 of a pair of drive shafts 16 and 18, which can lead to a pair of drive wheels or drive axles (both not shown).

A bevel gear train 20 mounted within the housing 12 interconnects the two drive shafts 16 and 18 for supporting equal and opposite directions of rotation with respect to the housing 12. Relative drive axial rotation in one direction is added to housing rotation, and relative drive axle rotation in the opposite direction subtracts from the housing rotation, allowing the drive shafts 16 and 18 to convey power in a common direction while rotating together with the housing 12 at different speeds.

One bevel side gear 22 of a pair is coupled for rotation with the drive shaft 16, and the other bevel side gear 24 of the pair is coupled for rotation with the drive shaft 18. Two bevel pinions 26 and 28 are mounted in the housing 12 for rotation on a cross pin 30, which defines a common pinion axis 32 intersecting the central axis 14. Each of the bevel pinions 26 and 28 mesh with both side gears 22 and 24 supporting opposite directions of side gear rotation within the housing 12.

Torque applied to the housing 12 is split between the drive shafts 16 and 18 by the bevel gear train 20. Small uneven divisions of torque can be supported by such conventional bevel gear trains 20 up to the "torque bias ratio" at which relative rotation (differentiation) occurs between the drive shafts 16 and 18. In a drive mode (acceleration), where torque transmits from the housing 12 to the drive shafts 16 and 18, more torque is transmitted to the slower rotating drive shaft 16 or 18. In a coast mode (deceleration), where torque transmits from the two drive shafts 16 and 18 to the housing 12, more torque is transmitted from the faster rotating drive shaft 16 or 18.

Figure 2:
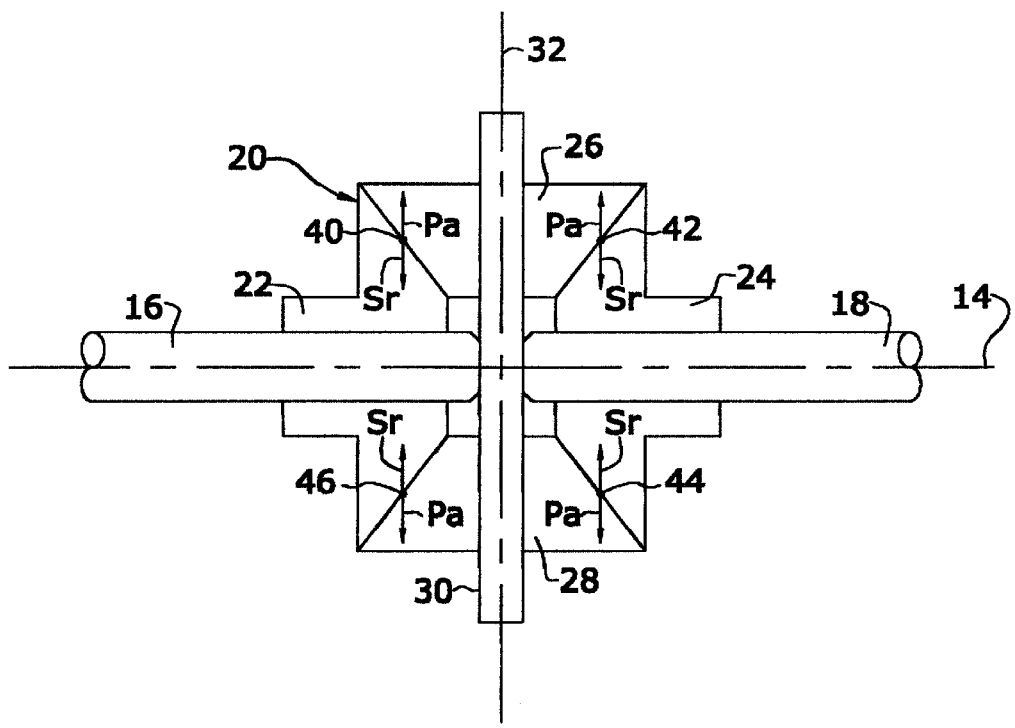
FIG. 2 is an abbreviated schematic of the conventional differential depicting gear separating forces along a pinion axis that extends perpendicular to the central axis.
Figure 3:
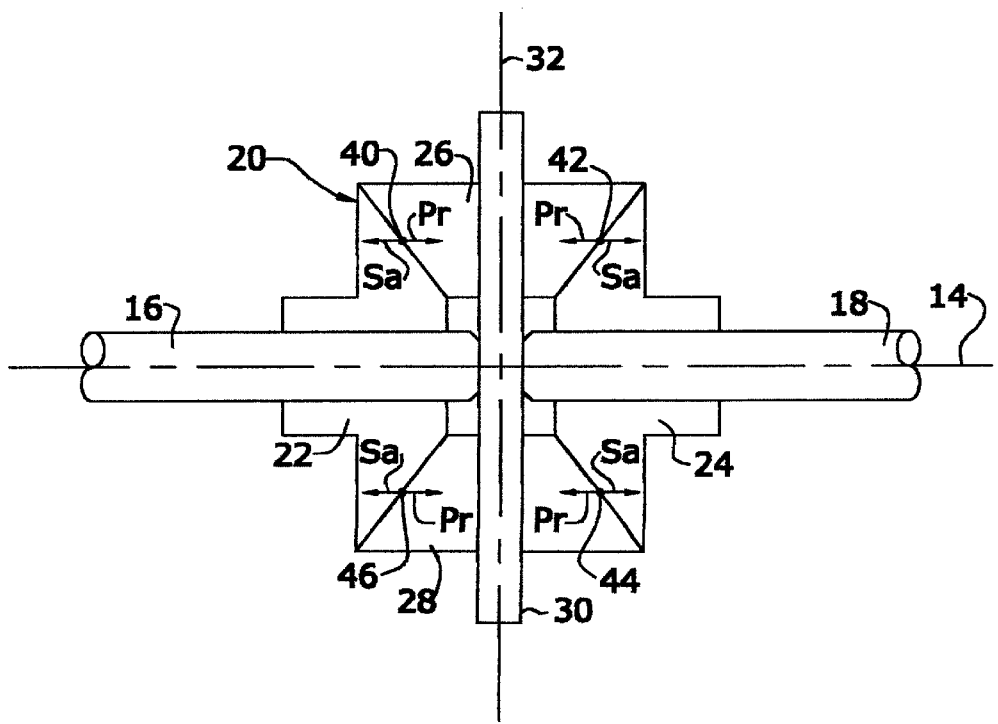
FIG. 3 is an abbreviated schematic of the conventional differential depicting gear separating forces along the central axis of the differential.

Torque transfers within the bevel gear train 20 between the pinions 26 and 28 and the side gears 22 and 24 generate at points of contact 40, 42, 44, and 46 meshing forces that can be resolved into axial and radial loading components as depicted in FIGS. 2 and 3. Gear separating forces directed parallel to the pinion axis 32 produce axial pinion loading forces "Pa" and radial side gear loading forces "Sr". Gear separating forces directed parallel to the central axis 14 produce radial pinion loading forces "Pr" and axial side gear loading forces "Sa".

In the conventional bevel gear differential 10, the radial side gear loading forces "Sr" generated by the two pinions 26 and 28 parallel to the pinion axis 32 tend to balance each other (i.e., sum to zero). Similarly, the radial pinion loading forces "Pr" parallel to the central axis 14 also tend to balance each other from opposite sides of each of the pinion gears 26 and 28. This leaves only the axial pinion and side gear loading forces "Pa" and "Sa" for restraint by the housing 12.

Figure 4:
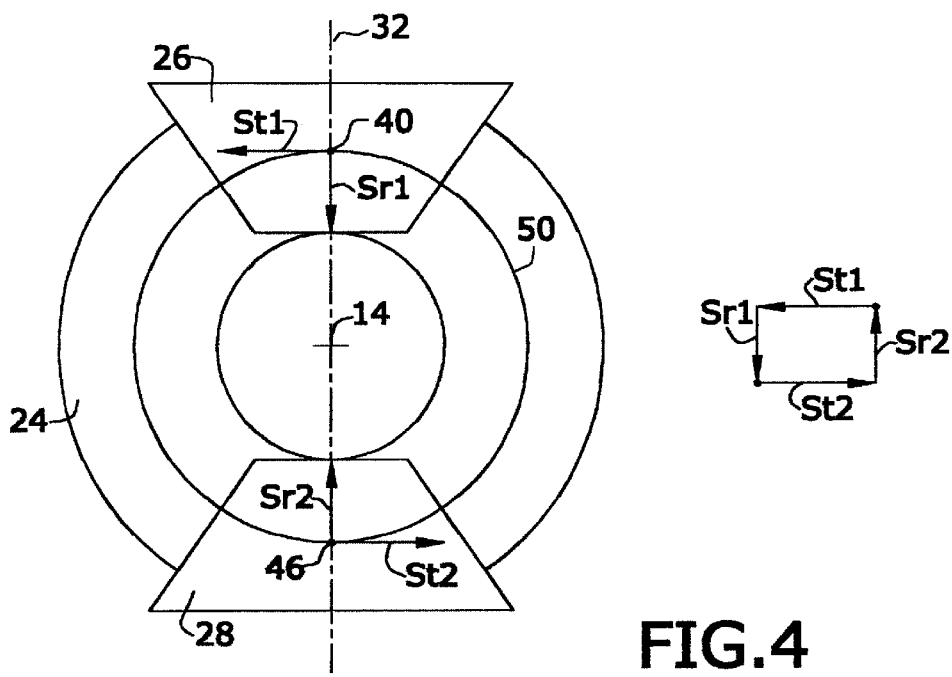
FIG. 4 is a force diagram of a symmetric distribution of pinions around a bevel side gear of the conventional differential taken along the central axis.

A force diagram in FIG. 4 shows a balance achieved between tangential loading forces "St1" and "St2" and the radial loading forces "Sr1" and "Sr2" at the two points of meshing contact 40 and 46 on a pitch circle 50 of the side gear 24. Both the tangential loading forces "St1" and "St2" and the radial loading forces "Sr1" and "Sr2" have equal but opposite magnitudes that sum vectorially to zero.

Figure 5:
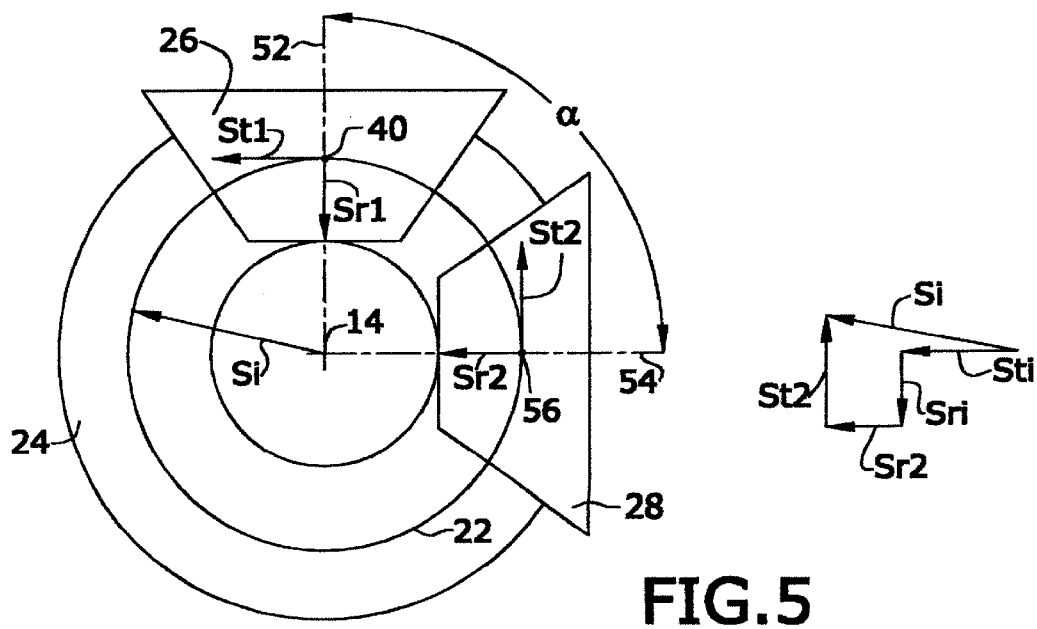
FIG. 5 is a force diagram showing an asymmetric distribution of bevel pinions around the central axis of the bevel side gear.

My invention disrupts this balance for the purpose of exploiting the radial loading force to extend performance options of bevel gear differentials. For example, one embodiment of my invention provides for rotating the pinion 28 through multiples of one-half side gear teeth around the central axis 14 to a new position such as shown in FIG. 5. The pinions 26 and 28 are mounted for rotation around separate pinion axes 52 and 54 that are relatively rotated from positions of alignment through an angle "α", which for simplicity of illustration is chosen at 90 degrees. The required division of the angle "α" into a multiple of one-half tooth increments assures that both pinions 26 and 28 continue to fit into mesh with both side gears 22 and 24.

The side gear tangential and radial loading forces "St2" and "Sr2" are similarly rotated through the angle "α" and extend from a new mesh point 56 between the pinion 28 and the side gear 24. When combined with the side gear tangential and radial loading forces "St1" and "Sr1", as shown in the adjoining vectorial diagram, a resulting imbalance force "Si" acts on the side gear 24 radially of the central axis 14. A similar imbalance force acts on the other side gear 22. Tipping moments "Mr" (not shown) are also produced by the imbalance forces "Si" acting through distances at which the side gears 22 and 24 are supported in the housing. Magnitudes of the axial side gear forces "Sa", which extend in the direction of the central axis 14, are not directly affected by the change in pinion position, but these forces "Sa" now generate combined tipping moments "Ma" (also not shown) because of their asymmetrical distribution around the central axis 14.

Figure 6:
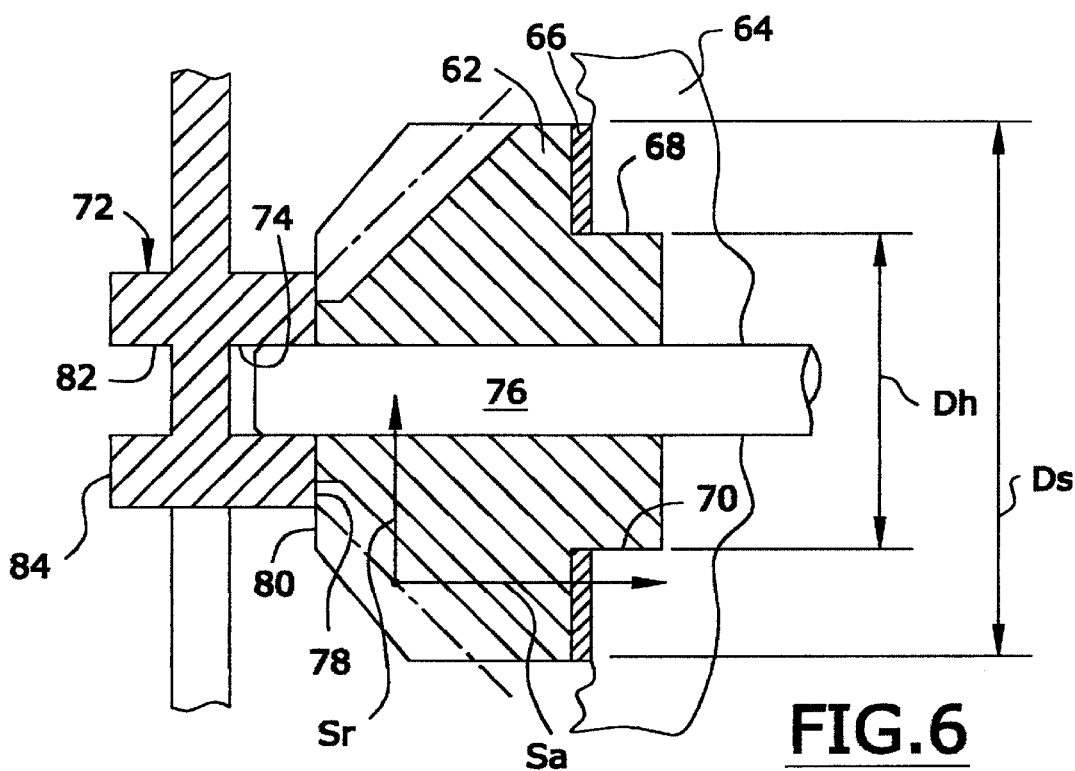
FIG. 6 is cross-sectional view showing side gear mounting features for accommodating additional forces and moments generated by the pinion asymmetry.
Figure 7:
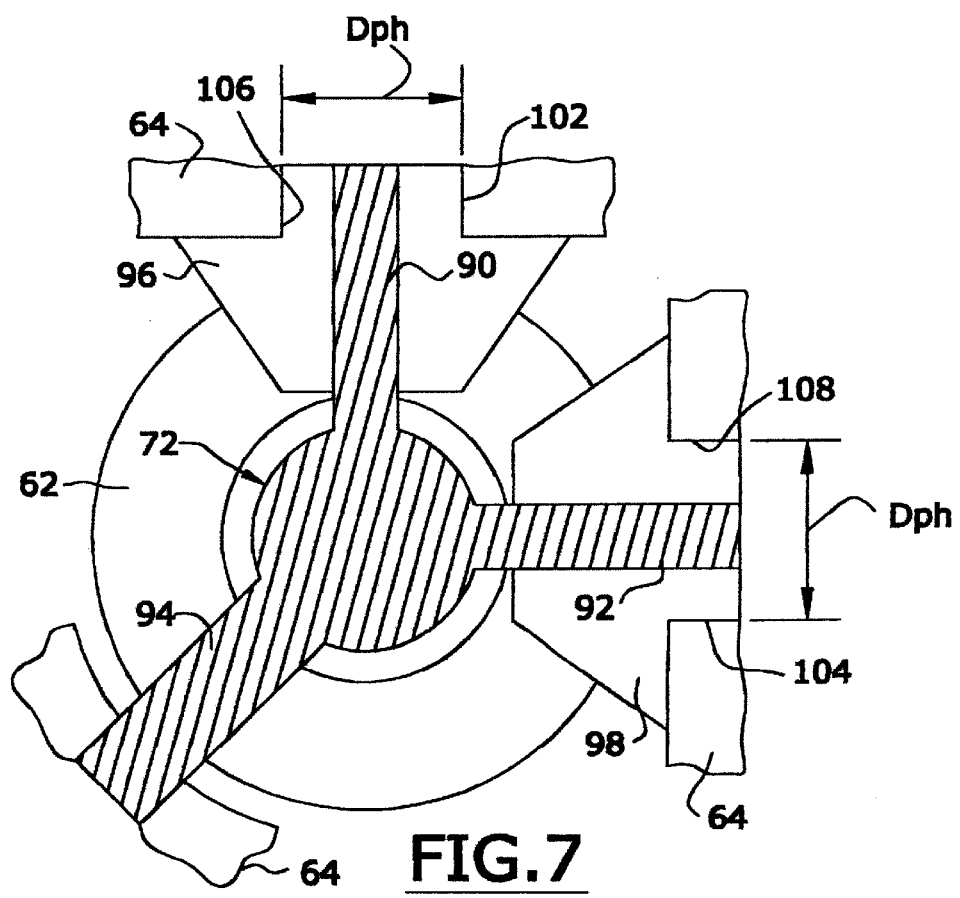
FIG. 7 is a cross-sectional view showing pinion gear mounting features providing similar accommodations.

The additional forces and moments "Si", "Mr", and "Ma" are restrained within the housing 12 to maintain the desired running positions of the side gears and pinions 22, 24 and 26, 28. FIGS. 6 and 7 illustrate some of my mounting preferences to accommodate these forces and moments while exploiting new opportunities for generating additional friction.

An alternative side gear 62 is mounted in a differential housing 64, which is only partially shown in FIG. 6. A friction washer 66 or other frictional interface with the housing 64 has a diameter "Ds" that extends well beyond a radial location of the axial side gear forces "Sa" generating the side gear moment "Ma". In addition to resisting tipping, the larger diameter "Ds" of the side gear-to-housing interface also generates additional friction opposed to rotation of the side gear 62.

Two other features provide options for straddle mounting the side gear 62 to further resist tipping and to exploit additional friction surfaces. At one end, the side gear 62 includes a hub 68 piloted in a housing bore 70. The hub 68 has an enlarged diameter "Dh" to resist tipping and to provide more frictional resistance to side gear rotation. At the other end, a spider spacer block 72 includes a bore 74 for piloting a drive shaft end 76 protruding from the side gear 62 and a frictional surface 78 for engaging an inner end face 80 of the side gear 62. A matching bore 82 and friction surface 84 are provided on an opposite side of the spider spacer block 72 to provide similar support and additional frictional interfaces with the other side gear (not shown).

The spider spacer block 72, which is also shown in FIG. 7 includes three legs 90, 92, and 94. Two of the legs 90 and 92 are formed as journal pins rotatively supporting the pinion gears 96 and 98. The remaining leg 94 anchors and centers the spider spacer block 72 within the housing 64. The legs 90 and 92 could be similarly anchored in the housing 64 providing the sole rotational support for the pinions 96 and 98; but for purposes of adding additional friction and support, hubs 102 and 104 are formed on the pinions 96 and 98 and are piloted in bores 106 and 108 formed in the housing 64. The hubs 102 and 104, which have diameters "Dph", provide increased frictional resistance to rotation of the pinions 96 and 98 and together with the journal pins 90 and 92 provide increased resistance to tipping of the pinion gears 96 and 98. The hubs 102 and 104 could also be used to provide the sole rotational support for the pinion gears 96 and 98.

Figure 8:
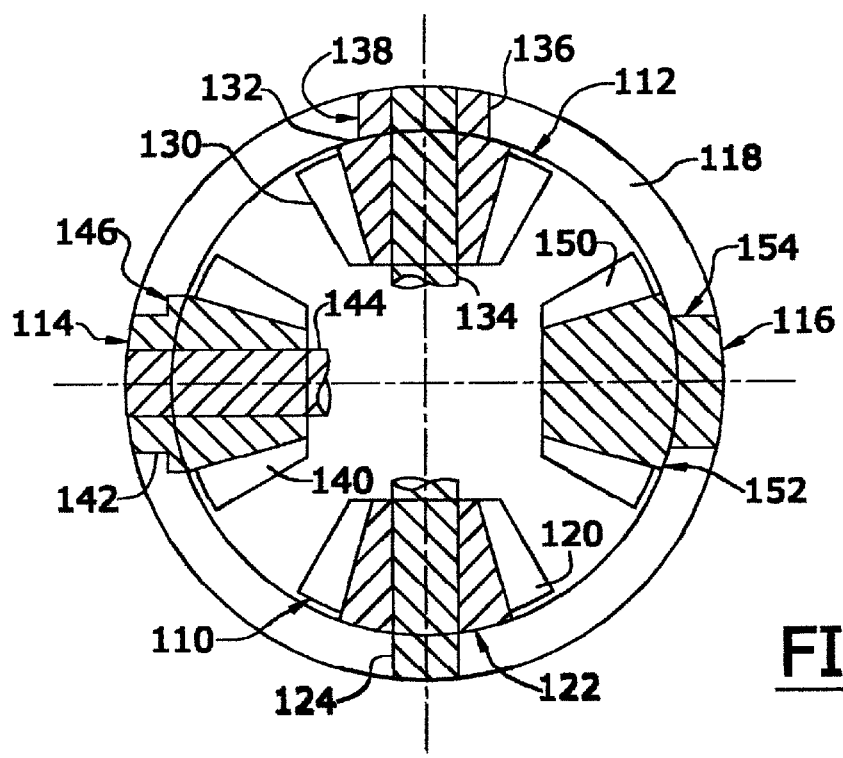
FIG. 8 is a cross-sectional view showing four different pinion mounting arrangements.

FIG. 8 depicts four different pinion mounting alternatives 110, 112, 114, and 116 within a housing 118. The pinion mounting 110 is a conventional mounting in which a pinion 120 having a spherical interface 122 with the housing 118 is supported for rotation on a journal pin 124. The spherical interface 122 restrains axial movement and centers the pinion 120 on the journal pin 124. The pinion mounting 112 includes similar features for supporting a pinion 130, including a spherical interface 132 and a journal pin 134. However, the pinion 130 also includes a hub 136 that forms a cylindrical interface 138 with the housing 118 to complete a straddle mounting for the pinion 130. The pinion mounting 114 also includes both a hub 142 and a journal pin 144 supporting a pinion 140 for rotation. However, instead of a spherical interface, a stepped hub interface 146 with the housing 118 provides for restraining axial movement toward the housing 118. The remaining pinion mounting 116 supports a pinion 150 directly within the housing 118 without a journal pin. The pinion 150 has a spherical interface 152 with the housing 118 to restrain axial movement and center the pinion 150 within the housing 118 and has a cylindrical interface 154 with the housing 118 to rotatively support the pinion 150 within the housing 118.

Other asymmetric distributions of pinion gears are possible, including different numbers of pinion gears in differing angular orientations. More pinion gears can be used to support additional torque transfers between side gears, and further asymmetry generally results in increased friction and the potential for higher bias ratios.

Figure 9:
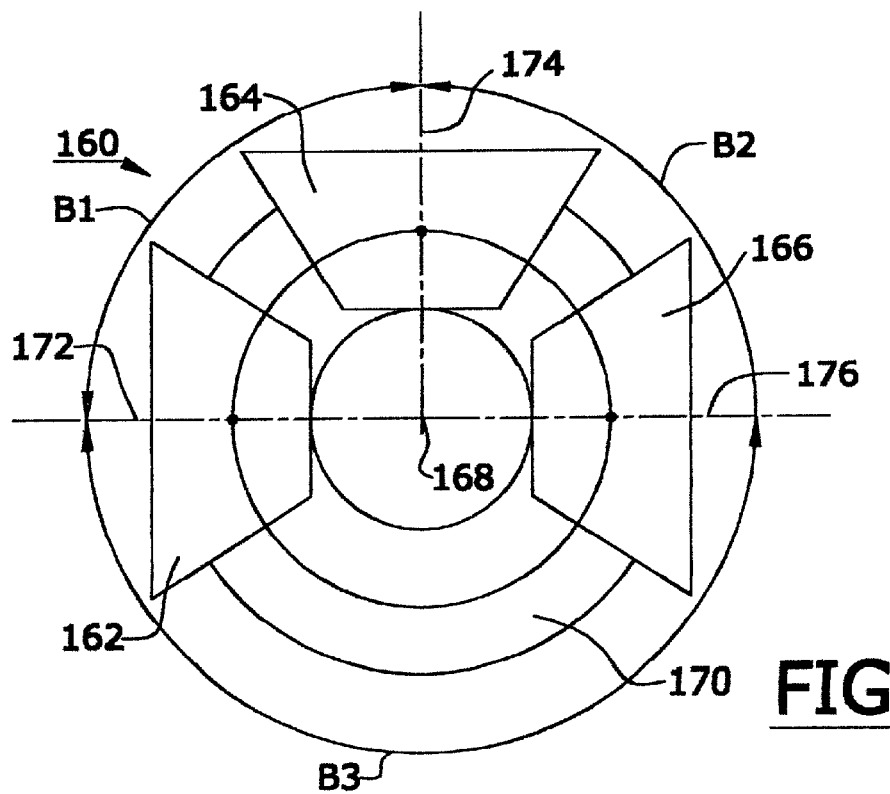
FIG. 9 is a schematic showing an asymmetric arrangement of three pinions around a central axis of a side gear.

A partial bevel gear train 160 shown in FIG. 9 includes three pinions 162, 164, and 166 that are asymmetrically angularly positioned around a central axis 168 of a side gear 170. Pinions 162 and 166 have axes 172 and 176 that are angularly separated from a pinion axis 174 of pinion 164 through angles "β1" and "β2" of approximately 90 degrees but are separated from each other through an angle "β3" of approximately 180 degrees. Angular separations of pinion axes through at least 180 degrees are preferred for generating large imbalancing forces, although smaller angular separations can be used for generating smaller imbalancing forces. The maximum angular separation is a function of the required rotational clearance between the pinions, the relative sizes of the pinions and gears (e.g., the ratio of tooth numbers between the pinions and gears), and the incremental assembly positions.

Asymmetric arrangements with four or more pinions are possible, but reduced available clearance limits the amount of angular separation between any two of the pinions. The increased torque proportioning capabilities of my new differentials can be supplemented by incorporating pre-loading devices that contribute additional friction and add to gear mounting stability. Torque splitting functions using side gears with different tooth numbers also benefit from the enhanced torque proportioning capabilities of my invention by providing a wider range of bias ratios in opposite directions of differentiation.

I claim:

1. A torque proportioning bevel gear differential comprising:
   a housing rotatable around a central axis of a pair of drive shafts;
   a pair of bevel side gears mounted in the housing for rotation with the drive shafts in opposite directions around the central axis; and
   a plurality of bevel pinions mounted in the housing, in mesh with the side gears, and in positions of rotation around respective axes that intersect the central axis and are asymmetrically distributed around the central axis for increasing radial loading force between the side gears and the housing.

2. The differential of claim 1 in which individual pinion and side gear meshes generate both a radial loading component perpendicular to the central axis and an axial loading component parallel to the central axis, and vector sums of both the radial and axial loading components generate tipping moments on the side gears.

3. The differential of claim 2 in which the side gears and the housing include axial thrust surfaces located at diameters that exceed diameters at which the axial loading components are applied to the side gears.

4. The differential of claim 2 further comprising a spacer block located between the side gears and having frictional surfaces for limiting side gear tipping.

5. The differential of claim 2 further comprising a spacer block located between the side gears and having bores for piloting inner ends of the drive shafts to limit side gear tipping.

6. The differential of claim 2 in which the pinions include hubs that are piloted in the housing to increase a frictional resistance to rotation.

7. The differential of claim 1 further comprising a spider block having a plurality of legs for supporting rotation of the pinions.

8. The differential of claim 7 in which the spider block includes an additional leg that anchors the spider block within the housing.

9. The differential of claim 1 in which the plurality of bevel pinions include at least three pinions having respective axes that are asymmetrically distributed around the central axis.

10. The differential of claim 2 in which two of the pinion axes are separated by at least 180 degrees around the central axis.

11. A bevel gear differential with imbalanced gear separating forces comprising:

a housing containing a gear train for interconnecting a pair of drive shafts aligned with a central axis of rotation of the housing;

the gear train including:
(a) two bevel side gears separately mounted for rotation with the drive shafts, and
(b) only two bevel pinions, each pinion separately meshing with both of the side gears; and a first of the only two pinions being mounted for rotation around a first pinion axis that intersects the central axis;

a second of the only two pinions being mounted for rotation around a second pinion axis that also intersects the central axis; and the first and second pinion axes being inclined with respect to each other for imbalancing separating forces between the pinion and side gears.

12. The differential of claim 11 in which meshing relationships between the pinions and side gears generate combined radial load on the side gears that increases as a function of an inclination angle between the first and second pinion axes.

13. The differential of claim 11 further comprising a spider block having a plurality of legs for supporting rotation of the pinions.

14. The differential of claim 13 in which a first and a second of the legs are formed by journal pins that rotatively support the pinions and a third of the legs centers the spider block within the housing.

15. The differential of claim 14 in which the third leg of the spider block is anchored in the housing.

16. The differential of claim 11 in which the pinions include hubs that are piloted in the housing to increase a frictional resistance to rotation.

17. The differential of claim 11 further comprising a spacer block located between the side gears and having frictional surfaces for limiting side gear tipping.

18. The differential of claim 11 further comprising a spacer block located between the side gears and having bores for piloting inner ends of the drive shafts to limit side gear tipping.

19. The differential of claim 11 in which the side gears and the housing include axial thrust surfaces located at diameters that exceed diameters at which axial loading components of the separating forces are applied to the side gears.

20. A bevel gear differential comprising:
a housing rotatable around a central axis;
a pair of bevel side gears mounted in the housing for rotation in opposite directions around the central axis;
a plurality of pinions mounted in the housing in mesh with both of the side gears to support the opposite directions of side gear rotation; and
a spider block having first and second legs rotationally supporting the pinions and a third leg anchored to the housing without rotationally supporting any of the pinions,
wherein said pinions are asymmetrically distributed around the central axis for increasing radial loading force between the side gears and the housing.

21. The differential of claim 20 in which the third leg centers the spider block within the housing.

22. The differential of claim 21 in which the third leg is evenly spaced from the first and second legs around the central axis.

23. The differential of claim 20 in which the spider block includes a spacer.

24. The differential of claim 23 in which the spacer includes friction surfaces separating the side gears.

25. The differential of claim 23 in which the spacer includes bores for piloting inner ends of drive shafts coupled for rotation with the side gears around the central axis.

* * * * *